2,703,776

METHOD OF BONDING FABRIC TO ANOTHER SURFACE

Sidney Arthur Leader, Folkestone, Kent, England, assignor to Peter Dumaresq Sheridan-Young, London, and Denis Arthur Leader, Ringwould, near Dover, England No Drawing. Application August 18, 1952, Serial No. 305,087

Claims priority, application Great Britain September 5, 1951

12 Claims. (Cl. 154—140)

This invention relates to thermoplastic materials.

It is known that polymerisation of styrene, monomeric acrylic and vinyl esters, can be readily effected at room temperature by the addition of organic peroxides such as benzoyl peroxide, plus dimethyl aniline or other tertiary amine which will react with the peroxide to evolve heat, such as dimethyl-p-toluidine.

For obvious reasons, it has hitherto been necessary to keep the reagents apart until the reaction is desired. For example, the benzoyl peroxide may be conveniently mixed with a finely comminuted or precipitated polymer, while the dimethyl aniline is added to the corresponding monomer which is stabilised with hydroquinone.

When the polymer and monomer are mixed to form a paste or workable "dough," after an initial static period dependent upon the concentration of the two principal reagents (oxygen and dimethyl aniline) an exothermic reaction occurs and polymerisation follows very rapidly.

The speed of polymerisation is also governed by the concentration of the principal reagents, particularly the oxygen evolved by the benzoyl peroxide. For convenience, generally about 2 to 3% of benzoyl peroxide by weight of the polymer, and 2 to 3% of dimethyl aniline by weight of the monomer, are employed, and in those concentrations polymerisation is effected in 15 to 20 minutes at room temperature, varying, of course, as the room temperature varies.

I have found that reagents of the above kind, namely a solid thermoplastic polymer, benzoyl or lauroyl peroxide, a polymerisable liquid ester which is compatible with the polymer and can be polymerised by the catalytic action of the benzoyl or lauroyl peroxide, and a tertiary amine such as dimethylaniline or dimethyl-p-toluidine which reacts with the peroxide with evolution of heat, can be used to impregnate or coat fabrics and to bond them to one another or to other surfaces. Very strong bonds can be formed in this way without the use of high pressure. My investigations have shown, however, that great difficulties stand in the way of employing a simple mixture, suspension or solution of the above reagents as the impregnating or coating agent, since polymerisation of the agent may take place prematurely, before the impregnating or coating and bonding have been completed, and since the process cannot be interrupted without waste of still unused coating or impregnating agent, which then inevitably polymerises.

The present invention provides fabric adapted to be bonded under low pressure to other like fabric or to other surfaces, the said fabric being impregnated or coated with a solid thermoplastic polymer and benzoyl or lauroyl peroxide, so that the fabric, on being wetted with a polymerisable liquid ester which is compatible with the polymer and can be polymerised by the catalytic action of the said peroxide and contains a tertiary amine which reacts with the said peroxide with evolution of heat, can be bonded as aforesaid under low pressure.

The present invention also provides a process for the production of the said fabric which comprises coating or impregnating the fabric with a solution or dispersion of the thermoplastic polymer containing also benzoyl or lauroyl peroxide and removing the solvent or dispersion medium by evaporation. The preferred impregnating or coating agent is a solution of a polyacrylic acid ester and benzoyl or lauroyl peroxide in a common solvent.

Suitable solvents include ketones, aromatic hydrocarbons and chlorinated paraffins, for example acetone, methyl ethyl ketone, chloroform and methylene chloride. The dispersions of the thermoplastic polymer are preferably aqueous dispersions made up with the aid of a known wetting or dispersing agent, for example a 30% aqueous dispersion of polymethyl methacrylate containing a known wetting or dispersing agent may be employed with the addition of benzoyl peroxide.

The present invention also provides a method of bonding fabric to other like fabric or to another surface, wherein fabric impregnated or coated as aforesaid is wetted with a polymerisable liquid ester which is compatible with the polymer and can be polymerised by the catalytic action of the said peroxide and contains a tertiary amine which reacts with the said peroxide with evolution of heat, and the wetted fabric is maintained in contact with other like wetted fabric or another surface until the polymerisable liquid ester has polymerised to form the desired bond.

The polymerisation occurs at lower temperatures than usual and may, for example, take place at 15° C., although this requires more time than polymerisation at higher temperatures such as 50° C. Polymerisation is much more rapid with benzoyl peroxide than with lauroyl peroxide.

The fabric referred to herein may be any material in sheet or layer form made up of fibres, threads or wires, for example textile fabric, paper, cardboard or wood veneer in which the fibres are not only coated but also impregnated, or a material such as wire gauze or fibre glass where the coating is on the surface of the material and between the fibres.

Since the tertiary amines contained in the polymerisable liquid ester are unstable bodies, it is preferred to add an anti-oxidant such as hydroquinone or ascorbic acid as a stabiliser. When the impregnated or coated fabric is wetted with the polymerisable liquid ester the peroxide in the fabric is present in sufficient concentration to overcome the action of the stabiliser and react with the tertiary amine.

Preferred polymerisable liquid esters are acrylic acid esters and polymerisable polyester resins such as the so-called "Marco" resins.

The invention may be applied with particular advantage to the bonding of fabrics together to form laminates. Since a firm bond can be produced merely by maintaining layers of wetted fabric in contact with one another, the use of massive two-part moulds or presses to apply pressure becomes superfluous. Moreover, since a stable liquid can be used for wetting the coated or impregnated fabrics immediately prior to bonding, the process can be carried out economically, unhurriedly and continuously, at will. The process may be interrupted for lunch or at the end of the day, without any special precaution, and the process continued at any time later, without loss of the fabric or the wetting liquid.

The latter may be poured into a simple dish or "dispenser" conveniently fixed near to the fabric, and the fabric made to pass through it as it is required for use.

The amount of liquid in the dish can be seen and the level maintained in a simple way, and only the surplus liquid in the dish, if any, would be wasted if not completely used and in practice this is negligible.

The preferred tertiary amines to be employed are:

1. Dimethyl-p-toluidine
2. Dimethylaniline

These may be added to the polymerisable liquid ester with the stabiliser at any time, if the contents are well sealed.

A fine degree of control of time and reaction temperature has been found possible by varying the amount of benzoyl peroxide present in the solution of dispersion of solid thermoplastic polymer, before impregnating the fabric and drying it.

The exothermic reaction is partly governed by the amount of liquid used, but to a lesser extent than by the concentration of the benzoyl peroxide.

One application of the invention is to the preparation of surgical splints.

This may be effected by impregnating an open weave bandage or other absorbent fabric or blotting or other absorbent paper or cardboard with a solution or dispersion of the polymer and benzoyl or lauroyl peroxide, drying the product and then when required wetting it with the polymerisable liquid ester as described above.

The liquid partially dissolves the polymer in the fabric, which becomes adhesive and softened, and the reaction which follows enables surgical splints to be made direct on to a limb and harden rapidly. In practice, and in contrast with plaster of Paris splint bandages, it is found possible to apply single layers of fabric, without haste, in successive strips or layers, and to reinforce angles or curves as required, at any stage during or after the operation, when it is deemed necessary to render a particular section more rigid. Plaster of Paris does not unite integrally with plaster which has already set, but the impregnated fabric unites perfectly and subsequent separation is impossible.

The advantages of such splints over plaster splints are:

(1) Greater strength compared with weight;
(2) Waterproof splints which are not affected by rain, mud, or immersion when bathing;
(3) They can be scrubbed and cleaned;
(4) In war, they can be decontaminated from poison gases by adequate washing and, unlike plaster, are impermeable to poison gases;
(5) They are permeable to X-rays which enables the position of the bones and the process of repair to be observed;
(6) when sawn or cut open with the usual plaster shears or other customary instrument, they can be forced open, removed and are thermoplastic;
(7) They may be heated and remoulded within limits, and re-used, by the simple expedient of uniting two halves or one slit and, with further material of the same nature.

The polymer may be polymerised methyl methacrylate which may economically be waste or scrap material. The solvent may, for example, be acetone or methyl ethyl ketone. Preferably the catalyst is benzoyl peroxide, which may conveniently be used in a proportion of from 3 to 20% by weight of the polymer.

Dibutyl phthalate or another compatible plasticiser may, if desired, be added to the wetting liquid, or incorporated in the impregnating solution or dispersion, to render the finished laminate more flexible if desired. A degree of flexibility is frequently desirable in surgical splints and is missing in plaster splints.

The following examples further illustrate the invention:

Example 1

100 gm. of polymethyl methacrylate were dissolved in 800 cc. of acetone and 2 gm. of benzoyl peroxide were added to the solution. Two square yards of open weave fibre glass fabric were immersed in the solution and dried and this was repeated until all the solution had been taken up.

The fabric was slightly stiffened by this means, could be handled without distortion (which was not the case before treatment) and be cut into convenient size and tailored to the shape of a wrist splint of six layers.

These layers were subsequently wetted with a wetting liquid consisting of methyl methacrylate monomer, containing 3% of dimethyl-p-toluidine and .02% of ascorbic acid, applied to the wrist (which had been coated with a silicone grease) and the fabric hardened in about one hour to form a strong, lightweight splint.

The experiment was repeated four times, using the same impregnating solution as before, save that the content of benzoyl peroxide was increased to: (i) 5 gm., (ii) 10 gm., (iii) 15 gm., (iv) 30 gm. The fabric was treated exactly as before with the following results:

(i) Hardening of the splint occurred in 43 minutes, with slight warmth.
(ii) Hardened in 27 minutes with greater but not intolerable heat.
(iii) In anticipation of excessive heat, only two layers were applied and an interval of 5 minutes allowed for evolution and dissipation of heat, before the next two layers were added, and a further interval of 5 minutes allowed before the last two layers of wetted fabric were applied. No discomfort was experienced and the result was excellent.
(iv) Heat evolution was more marked when two layers were applied so the remaining layers were applied as single sheets, at five-minute intervals and a perfect splint was produced.

These splints were subsequently divided along the outer border of the wrist and forearm, with an ordinary surgical plaster shears, when it was possible to force the splint open and remove it very easily.

One of them was replaced an hour later and the cut margin closed and united with a strip of the waste impregnated fabric, wetted with the above-described wetting liquid. Another splint was divided into two complete halves, representing the palmar and dorsal aspects of the wrist and forearm. This was placed on the wrist and united with strips of waste cuttings from the fabric wetted with the wetting liquid as before. In each case a satisfactory joint was made. It is current surgical practice to remove a splint after two or three weeks, sometimes sooner if swelling of the limb occurs, apply massage and replace with a new splint in the case of plaster of Paris. New plaster will not unite properly with old plaster, and if this is attempted adhesive bandage must be used to assist matters, but is rarely satisfactory.

The ease and accuracy with which a laminated splint produced as described above can be removed, modified and replaced has been found of great advantage. It has also the advantage over a plaster of Paris splint that clear X-ray pictures can be obtained of the splinted limb without disturbing the splint.

This applies equally to fibre glass, cotton and paper laminates prepared as described in the foregoing example.

Example 2

20 gm. of benzoyl peroxide and 80 gm. of polymethyl methacrylate were dissolved in 500 gm. of chloroform, which produced a somewhat viscous solution. One square yard of a heavy grade fibre glass fabric was passed through the solution (after the fabric had been de-sized by washing in hot water and drying) and the resinous solution adhered to the fabric. A "doctor blade" was used to remove excess of the solution as the fabric was removed from the bath, leaving an even film on the fabric. This was dried in a warm current of air in 10 minutes.

About half of the coated fabric was used to prepare three foot arch supports, applied directly to the skin but the skin was first given a coating of a silicone lubricant as a barrier. Three layers of the fabric were required to produce a laminate of sufficient strength, each being roughly tailored to shape before use, but all three applied together, after wetting with methyl methacrylate monomer which had been stabilised with 0.1% of hydroquinone and activated with 3% of dimethylaniline.

The effect of the monomer on the fabric is always to soften it and render it flexible and adhesive, so that it can readily be shaped to the tissues. The foot supports hardened in situ with some evolution of heat, but this was at no time unbearable. When rigid, in 5 minutes, they were removed and carefully trimmed with shears, filed smooth at the margins and the margins received two coats of the residual monomer to produce a polish.

The remaining part of the fabric was set aside and tested at monthly intervals, by the formation of small laminates, and found to be fully active up to twelve months.

Example 3

30 gm. of benzoyl peroxide and 100 gm. of polymethyl methacrylate were dissolved in 600 cc. of methylene chloride and this was used to impregnate two dozen cotton bandages of 3-inch width. The bandages were hung up to dry and dried in one hour, when they were re-rolled.

The bandages were used to make laminates substantially as described in the foregoing examples, using as the wetting liquid methyl methacrylate monomer containing 3% by volume of dimethyl-p-toluidine and 0.05% by weight of hydroquinone.

In this way a perfect splint was made and used with excellent results in a hospital in treating a fracture of the fibula, near the ankle.

Others of the bandages were used to produce various laminates such as angular and tubular structures which were tested for impact strength and were found to be extremely strong for their weight.

Two small sections of angular laminates 1½" wide and ³⁄₁₆" thick, were stuck together by wetting with the monomeric wetting liquid and tested for strength and adhesion. Holes bored in each section enabled the assembly to be fixed to a beam by one section while a 200-lb. weight was suspended from the other section. The assembly resisted distortion and breakage.

*Example 4*

A solution of 20 gm. of benzoyl peroxide and 100 gm. of polymethyl methacrylate in 500 cc. of acetone was used to impregnate several sheets of ordinary newspaper, which were then dried.

They were wetted with methyl methacrylate monomer, stabilized with 0.02% by weight of ascorbic acid and activated by 5% by volume of dimethylaniline. A laminate consisting of 20 layers of the wetted newspaper was placed between sheets of polythene film, on a bench, covered with a flat sheet of metal. In 15 minutes the laminate was rigid but smelled of the monomer, but at the end of one hour the smell of monomer had disappeared and the laminate, when removed from the polythene protective film, was free of smell, quite dry and manifested very great rigidity and strength.

It was found that this laminate and all laminates prepared as described in the foregoing examples, can be sawn, drilled and tapped for screws.

The following are further examples of uses to which the invention has been put, using the same impregnating solution and wetting liquid as that of Example I:

*Example 5*

An area of one square yard of dry, brick wall was primed with a solution of waste methyl methacrylate polymer dissolved in acetone and allowed to dry. Four sheets of newspaper, impregnated and dried, were used to cover it by the ordinary wallpaper technique, using a flat brush dipped in the wetting liquid, and each layer of paper successively applied to the brickwork, where they rapidly hardened to form an adherent, waterproof and gas-proof laminate.

*Example 6*

Three sheets of heavy canvas were impregnated and dried. They were subsequently united by wetting with the wetting liquid to form a very strong and rigid mass, showing that it is practical to produce a watertight hut, tent or similar structure of any shape, without supporting poles, by means of such canvas. The rigid sheets of canvas can be united very quickly with strips of impregnated canvas, paper or fibre glass wetted with the wetting liquid.

*Example 7*

The top of an old desk was covered with two layers of impregnated cotton fabric wetted with the wetting liquid. The desk looked as good as new.

*Example 8*

An impregnated cotton bandage, six inches wide, was wetted with the wetting liquid and applied to effect a waterproof and rigid seal between the gable and wall of a factory, where subsidence had caused a space to appear and the rain entered.

*Example 9*

An exposed waterpipe which had twice frozen in the winter and on the second occasion burst, was on that occasion wound round with a length of impregnated fibre glass wetted with the wetting liquid, three layers been applied, as a make-shift repair, but has since proved perfectly watertight and it is not intended to disturb it.

*Example 10*

A broken electric junction box was repaired by covering it with several layers of impregnated and wetted fibre glass about seven months ago and appears to be very satisfactory. (Both fibre glass and methyl methacrylate polymer are excellent insulators as is well-known.)

Lamp shades and stands, dolls, tea trays, attache cases and handles and other objects can be made without metal moulds by building up laminates by the process of the invention on plaster, wood or inflated rubber formers, from textile fabric or paper, in various colours, with or without patterns previously printed upon them.

Furthermore, the fabric may be wire gauze, which may be used to reinforce weaker fabric or to wholly displace the latter. Thus, wire gauze was used to reinforce the heel and sole of a foot splint, to increase its resistance to attrition and to eliminate the iron stirrup needed in a plaster splint.

What I claim is:

1. A process for the production of a fabric adapted to be bonded under low pressure to other like fabric and to other surfaces, which comprises treating the fabric with a non-polymerizable liquid composition consisting of a solution of a thermoplastic polymer in an organic solvent containing also an organic peroxide selected from the group consisting of benzoyl peroxide and lauroyl peroxide, and evaporating the solvent to deposit the thermoplastic polymer and the organic peroxide in and on the fabric.

2. A process for the production of a fabric adapted to be bonded under low pressure to other like fabric and to other surfaces, which comprises treating the fabric with a non-polymerizable liquid composition consisting of a dispersion of a thermoplastic polymer in a dispersion medium containing also an organic peroxide selected from the group consisting of benzoyl peroxide and lauroyl peroxide, and evaporating the dispersion medium to deposit the thermoplastic polymer and the organic peroxide in and on the fabric.

3. A process for the production of a fabric adapted to be bonded under low pressure to other like fabric and to other surfaces, which comprises treating the fabric with a non-polymerizable liquid composition consisting of a solution of a thermoplastic polymer in an organic solvent selected from the group consisting of ketones, aromatic hydrocarbons and chlorinated paraffins, the said solution containing also an organic peroxide selected from the group consisting of benzoyl peroxide and lauroyl peroxide, and evaporating the solvent to deposit the thermoplastic polymer and the organic peroxide in and on the fabric.

4. A process for the production of a fabric adapted to be bonded under low pressure to other like fabric and to other surfaces, which comprises treating the fabric with a non-polymerizable liquid composition consisting of a solution of polymethyl methacrylate in acetone containing also benzoyl peroxide, and heating the treated fabric to evaporate the acetone and deposit the polymethyl methacrylate and benzoyl peroxide in and on the fabric.

5. A process for the production of a fabric adapted to be bonded under low pressure to other like fabric and to other surfaces, which comprises treating the fabric with a non-polymerizable liquid composition consisting of a solution of polymethyl methacrylate in chloroform containing also benzoyl peroxide, and heating the treated fabric to evaporate the chloroform and deposit the polymethyl methacrylate and benzoyl peroxide in and on the fabric.

6. A process for the production of a fabric adapted to be bonded under low pressure to other like fabric and to other surfaces, which comprises treating the fabric with a non-polymerizable liquid composition consisting of a solution of polymethyl methacrylate in methylene chloride containing also benzoyl peroxide, and heating the treated fabric to evaporate the methylene chloride and deposit the polymethyl methacrylate and benzoyl peroxide in and on the fabric.

7. A method of bonding fabric to another surface, which comprises wetting a fabric loaded with a solid thermoplastic polymer and an organic peroxide selected from the group consisting of benzoyl peroxide and lauroyl peroxide with a liquid composition consisting of a stabilized monomeric polymerisable liquid ester which is compatible with the polymer and can be polymerised by the catalytic action of the said peroxide and contains a tertiary amine which reacts with the said peroxide with evolution of heat, and maintaining the wetted fabric in contact with said other surface until the polymerisable liquid ester has polymerised to form the desired bond.

8. A method of bonding fabric to other like fabric, which comprises wetting fabric loaded with a solid thermoplastic polymer and an organic peroxide selected from the group consisting of benzoyl peroxide and lauroyl peroxide with a liquid composition consisting of a stabilized monomeric polymerisable liquid ester which is compatible with the polymer and can be polymerised by the catalytic action of the said peroxide and contains a tertiary amine which reacts with the said peroxide with evolution of heat, and maintaining the wetted fabric in contact with other like loaded fabric until the polymerisable liquid ester has polymerised to form the desired bond.

9. A method of bonding fabric to other like fabric, which comprises wetting fabric, loaded with polymethyl methacrylate and benzoyl peroxide, with monomeric methyl methacrylate liquid containing dimethyl-p-toluidine and an anti-oxidant, and maintaining the wetted fabric in contact with other like loaded fabric until the monomeric methyl methacrylate has polymerised to form the desired bond.

10. A method of bonding fabric to other like fabric, which comprises wetting fabric, loaded with a polymethyl methacrylate and benzoyl peroxide, with monomeric methyl methacrylate liquid containing dimethylaniline and an anti-oxidant, and maintaining the wetted fabric in contact with other like loaded fabric until the monomeric methyl methacrylate has polymerised to form the desired bond.

11. A method of bonding fabric to other like fabric, which comprises treating said fabrics with a non-polymerizable liquid composition consisting of a solution of a thermoplastic polymer in an organic solvent containing also an organic peroxide selected from the group consisting of benzoyl peroxide and lauroyl peroxide, evaporating the solvent to deposit the thermoplastic polymer and the organic peroxide in and on the fabrics, wetting the fabrics with a liquid composition consisting of a stabilized monomeric polymerizable liquid ester, which is compatible with the polymer and can be polymerized by the catalytic action of the said organic peroxide, and a tertiary amine which reacts with the said organic peroxide with evolution of heat, and maintaining the wetted fabrics in contact with one another until the polymerizable liquid ester has polymerized to form the desired bond.

12. A method of bonding fabric to another surface, which comprises treating said fabric with a non-polymerizable liquid composition consisting of a solution of a thermoplastic polymer in an organic solvent containing also an organic peroxide selected from the group consisting of benzoyl peroxide and lauroyl peroxide, evaporating the solvent to deposit the thermoplastic polymer and the organic peroxide in and on the fabric, wetting the fabric with a liquid composition consisting of a stabilized monomeric polymerizable liquid ester, which is compatible with the polymer and can be polymerized by the catalytic action of the said organic peroxide, and a tertiary amine which reacts with the said organic peroxide with evolution of heat, and maintaining the wetted fabric in contact with said other surface until the polymerizable liquid ester has polymerized to form the desired bond.

References Cited in the file of this patent

UNITED STATES PATENTS

| | | |
|---|---|---|
| 2,346,036 | Leary | Apr. 4, 1944 |
| 2,480,928 | Hurdis | Sept. 6, 1949 |
| 2,495,175 | Nagel | Jan. 17, 1950 |
| 2,639,258 | Evans et al. | May 19, 1953 |

FOREIGN PATENTS

| | | |
|---|---|---|
| 883,679 | France | Mar. 29, 1943 |
| 888,775 | France | Sept. 13, 1943 |